July 24, 1928.
F. G. FAHRBACH
1,678,003
REPAIR DEVICE FOR AUTO SKID CHAINS
Filed April 19, 1927
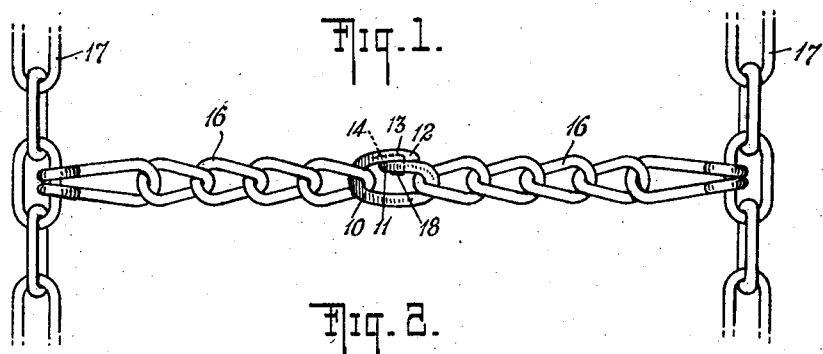
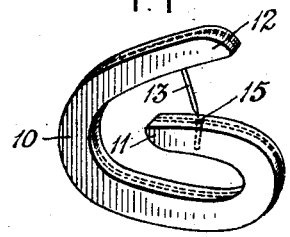
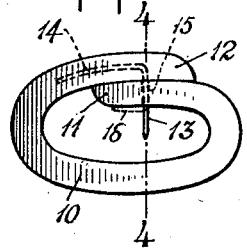 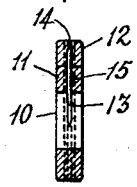
WITNESS
INVENTOR
FERDINAND G. FAHRBACH
BY
ATTORNEYS Patented July 24, 1928.

1,678,003

UNITED STATES PATENT OFFICE.

FERDINAND G. FAHRBACH, OF PELHAM MANOR, NEW YORK.

REPAIR DEVICE FOR AUTO SKID CHAINS.

Application filed April 19, 1927. Serial No. 184,850.

The invention relates to devices for repairing broken elements of anti-skid chains and more particularly to devices for repairing the cross chains of such anti-skid chains and has for its object to provide a repair link of novel construction capable of being easily fixed in place to connect the ends of the broken element in an easy manner. Other more specific objects will appear from the description hereinafter and the features of novelty will be pointed out in the claims.

In the accompanying drawing which illustrates an example of the invention, Fig. 1 is a fragmentary view of a conventional form of anti-skid chains with the repair device in position on a cross chains thereof; Fig. 2 is a perspective view of the repair link in its open position; Fig. 3 is a view of the repair link in its closed position, and Fig. 4 is a sectional view on the line 4—4 of Fig. 3.

As shown in the drawings, the repair device comprises a link 10 provided with opposite free ends 11 and 12 capable of being separated as indicated in Fig. 2 to permit the repair link to be opened and attached to the ends of a broken element in the anti-skid chain. In the preferred arrangement, the ends 11 and 12 are adapted to overlap as shown in Fig. 3 and are detachably secured together in any convenient manner to maintain the link against opening; the fastening means preferably is of such a character that no part thereof is subjected to the wearing effects of the road or to contact with the tire when the anti-skid chain, in which a repair link has been incorporated, is in use. In the illustrated example the securing means comprises a pin 13 of aluminum or other suitable metal embedded in the end 12 of the repair link as indicated at 14 in Fig. 3 so as to project transversely therefrom for insertion into an opening 15 with which the end 11 of said repair link is in such case provided. The repair link is constructed of flexible material preferably possessing also the inherent quality of being elastic and in its preferred form is made of rubber or a combination of rubber and fabric or other material.

In practice, assuming that a cross chain 16 of the anti-skid chain 17 has become broken, the terminal links of the broken cross chain may be connected by means of the repair link herein described. This may be accomplished by adjusting the repair link to the position shown in Fig. 2, then inserting it successively through said terminal links and then passing the pin 13 through the opening 15; after the pin has thus been inserted through said opening the inwardly projecting portion thereof may be bent into surface engagement with the end 11 of the repair link as shown at 18 in Figs. 1 and 3. If more than one link is required to repair the damaged cross chain, a plurality of repair links may first be connected with each other and then with the terminal links of the broken chain in the manner hereinbefore set forth. It will be noted that in the operative position of the repair link no part of the fastening device, that is the pin 13, comes into engagement with the road over which the same travels in use or with the tire upon which the same is being used; as the result of this, the fastening device itself is not subjected to the wearing effects of the road nor is it capable of inflicting any damage upon the said tire. The repair link is easily and quickly placed in position to connect the ends of the broken chain element and when in place serves to efficiently repair the damage caused by one or more broken original links in said element. Because of the flexibility and preferably also the elasticity inherent in the repair link the connection between said broken ends retains the flexibility of the original chain element and imparts thereto, in addition, properties which absorb strains to which the chain element may be subjected in use, which properties at the same time reduces the strains upon the fastening device such as the pin 13 to a minimum.

Various changes in the specific form shown and described may be made within the scope of the claim without departing from the spirit of my invention.

I claim:

A repair device for the cross-chains of anti-skid chains comprising a link of rubber having opposite ends overlapping each other in separable engagement for connecting said rubber link with the terminal links of a broken cross-chain, one of said ends being provided with an opening, and a pin embedded in the other of said link ends and projecting transversely therefrom for insertion into said opening whereby said link ends are detachably connected with each other.

In testimony whereof I have hereunto set my hand.

FERDINAND G. FAHRBACH.